(12) United States Patent
Shin et al.

(10) Patent No.: US 9,254,833 B2
(45) Date of Patent: Feb. 9, 2016

(54) METHOD AND SYSTEM FOR CHARGING BATTERY FOR HYBRID ELECTRIC VEHICLE

(71) Applicants: Hyundai Motor Company, Seoul (KR); Kia Motors Corporation, Seoul (KR)

(72) Inventors: Dongjun Shin, Gyeonggi-do (KR); Gum Jin Park, Gyeonggi-Do (KR); Yong Kak Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 158 days.

(21) Appl. No.: 13/709,975

(22) Filed: Dec. 10, 2012

(65) Prior Publication Data

US 2014/0074331 A1    Mar. 13, 2014

(30) Foreign Application Priority Data

Sep. 12, 2012  (KR) .................. 10-2012-0101214

(51) Int. Cl.
*B60W 20/00* (2006.01)
*B60W 10/02* (2006.01)
(Continued)

(52) U.S. Cl.
CPC *B60W 20/00* (2013.01); *B60L 7/18* (2013.01); *B60L 11/123* (2013.01); *B60L 11/14* (2013.01); *B60L 11/1862* (2013.01); *B60W 10/02* (2013.01); *B60W 10/06* (2013.01); *B60W 10/08* (2013.01); *B60W 10/26* (2013.01); *B60W 20/1062* (2013.01); *B60W 30/18072* (2013.01); *B60K 2006/4825* (2013.01); *B60L 2200/10* (2013.01); *B60L 2200/18* (2013.01); *B60L 2200/32* (2013.01); *B60L 2200/40* (2013.01); *B60L 2240/12* (2013.01); *B60L 2240/36* (2013.01); *B60L 2240/423* (2013.01); (Continued)

(58) Field of Classification Search
USPC ............................................ 701/22; 903/930
See application file for complete search history.

(56) References Cited

U.S. PATENT DOCUMENTS

| 6,209,672 B1 * | 4/2001 | Severinsky | B60K 6/442 180/65.23 |
| 6,338,391 B1 * | 1/2002 | Severinsky | B60K 6/442 180/65.23 |

(Continued)

FOREIGN PATENT DOCUMENTS

| KR | 20050115639 A | 12/2005 |
| KR | 20080001817 A | 1/2008 |
| KR | 20080016232 A | 2/2008 |

*Primary Examiner* — Helal A Algahaim
*Assistant Examiner* — Genna Mott
(74) *Attorney, Agent, or Firm* — Mintz Levin Cohn Ferris Glovsky and Popeo, P.C.; Peter F. Corless

(57) ABSTRACT

Disclosed herein is a method and system for charging a battery of a hybrid electric vehicle driven with power of an engine and/or a motor, the method including detecting an accelerator pedal position by an accelerator position detector, detecting a brake pedal position by a brake position detector, determining, by a controller, when the vehicle is coasting based on manipulation of the accelerator pedal and the brake pedal; determining when a state of charge of the battery is a charged state having a value equal to or smaller than a set value; and maintaining the engine in a driving state and rotating the driving motor with engine power to charge the battery with generated power of the driving motor when the state of charge of the battery is the charged state having the value equal to or smaller than the set value and the hybrid electric vehicle is coasting.

13 Claims, 7 Drawing Sheets

(51) Int. Cl.
  *B60W 10/06* (2006.01)
  *B60W 10/08* (2006.01)
  *B60W 10/26* (2006.01)
  *B60W 30/18* (2012.01)
  *B60L 11/14* (2006.01)
  *B60L 7/18* (2006.01)
  *B60L 11/12* (2006.01)
  *B60L 11/18* (2006.01)
  *B60K 6/48* (2007.10)

(52) U.S. Cl.
  CPC ...... *B60L2240/443* (2013.01); *B60L 2240/445* (2013.01); *B60L 2240/545* (2013.01); *B60L 2240/547* (2013.01); *B60L 2240/549* (2013.01); *B60L 2240/642* (2013.01); *B60L 2240/662* (2013.01); *B60L 2250/26* (2013.01); *B60L 2260/24* (2013.01); *B60W 2510/244* (2013.01); *B60W 2540/10* (2013.01); *B60W 2540/12* (2013.01); *Y02T 10/6217* (2013.01); *Y02T 10/6252* (2013.01); *Y02T 10/6286* (2013.01); *Y02T 10/642* (2013.01); *Y02T 10/705* (2013.01); *Y02T 10/7005* (2013.01); *Y02T 10/7044* (2013.01); *Y02T 10/7077* (2013.01); *Y02T 10/7258* (2013.01); *Y02T 10/7291* (2013.01); *Y02T 90/16* (2013.01); *Y10S 903/93* (2013.01)

(56) References Cited

U.S. PATENT DOCUMENTS

| | | | |
|---|---|---|---|
| 7,497,285 B1* | 3/2009 | Radev | 180/65.225 |
| 8,474,556 B2* | 7/2013 | Wang | B60K 6/40 180/65.22 |
| 2001/0039230 A1* | 11/2001 | Severinsky | B60H 1/004 477/3 |
| 2008/0300743 A1* | 12/2008 | Conlon et al. | 701/22 |
| 2011/0136620 A1* | 6/2011 | Gibson et al. | 477/64 |

* cited by examiner

METHOD AND SYSTEM FOR CHARGING BATTERY FOR HYBRID ELECTRIC VEHICLE

CROSS-REFERENCE TO RELATED APPLICATION

This application claims priority to and the benefit of Korean Patent Application No. 10-2012-0101214 filed in the Korean Intellectual Property Office on Sep. 12, 2012, the entire contents of which are incorporated herein by reference.

BACKGROUND OF THE INVENTION (a) Field of the Invention

The present invention relates to a method and a system for charging a battery of a hybrid electric vehicle driven by power of an engine and/or a motor.

(b) Description of the Related Art

As is well known, due to increases in oil prices and exhaust gas regulations, eco-friendly policies and fuel efficiency improvement have been researched in the development of a vehicle. Accordingly, vehicle manufacturers have developed a technology for reducing fuel and decreasing exhaust gas to meet eco-friendly policies and improve fuel efficiency. Additionally, the vehicle manufacturers have focused efforts in developing a technology of a hybrid electric vehicle (HEV) which efficiently combines and uses power of an engine and power of a motor to achieve high fuel efficiency.

FIG. 1 illustrates an exemplary configuration of a conventional parallel hybrid electric vehicle.

Referring to FIG. 1, the hybrid electric vehicle may include an engine 10, a driving motor 20, an engine clutch 30 for combining or releasing power between the engine 10 and the driving motor 20, a transmission 40, a differential gear device 50, a battery 60, a starting/generating motor 70 for starting the engine 10 or generating power to be output by the engine 10, and a plurality of wheels 80.

Further, the hybrid electric vehicle may include a hybrid control unit (HCU) for controlling entire operations of the hybrid electric vehicle and a battery control unit (BCU) 120 for managing and controlling the battery 60. The battery control unit 120 may be called a battery management system (BMS).

The constituent elements of the hybrid electric vehicle are obvious to those skilled in the art, and thus a more detailed description will be omitted. The starting/generating motor 70 may be called an integrated starter and generator (ISG) or a hybrid starter and generator (HSG) in the known art.

The hybrid electric vehicle may be driven in a driving mode, such as, an electric vehicle (EV) mode using only power of the driving motor 20; a hybrid electric vehicle (HEV) mode using torque of the driving motor 20 as auxiliary power while using torque of the engine 10 as main power; and a regenerative braking (RB) mode collecting braking and inertia energy through power generation of the driving motor 20 to charge the battery 60 during braking or driving using the inertia of the vehicle.

As described above, the hybrid electric vehicle uses both mechanical energy of the engine and electric energy of the battery, uses an optimum operation region of the engine and the driving motor, and collects the energy of the driving motor while braking, thereby improving fuel efficiency and efficiently using the energy. Moreover, in the hybrid electric vehicle, a driving method may be generally divided according to a state of charge (SOC) of the battery 60.

FIG. 2 is an exemplary diagram illustrating an SOC state of the battery 60 according to a driving method of the hybrid electric vehicle. Referring to FIG. 2, the battery 60 of the hybrid electric vehicle may be divided into a critical overcharge region CH (critical high), an overcharge region H (high) a normal charge region B (normal), a low charge region L (low) and a critical low charge region CL (critical low) according to an SOC. The low charge region may be divided approximately in half to be two regions L1 and L2.

A battery control unit 120 of the hybrid electric vehicle may perform part load charge control, idle charge control, and power limit control to maintain the SOC of the battery 60 as illustrated in FIG. 2. Based on the contents illustrated in FIG. 2, the part load charge control is generally performed when the SOC of the battery is in the normal charge region N. The idle charge control is generally performed when the SOC of the battery is in the upper low charge region L1. The power limit control is generally performed when the SOC of the battery is in the lower low charge region L2 and the critical low charge region CL.

When a driver accelerates during driving and the engine is maintained in an operation state, the part load charge control controls the rotation of the driving motor 20 to generate power of the engine 10 to charge the battery with the output power. While the vehicle accelerates, the part load charge control may maintain a SOC by using a redundant power of the engine.

The idle charge control controls the rotation of the starting/generating motor 70 to generate power of the engine 10, regardless of manipulation of the accelerator pedal, the brake pedal and a vehicle speed, to change the low SOC of the battery to charge the battery with the output power. The idle charge control is control of charging the battery in order to get out of a charge insufficient state of the battery 60 regardless of a vehicle speed.

The power limit control limits power used in electronic equipment of a high voltage power module system. However, since the hybrid electric vehicle repeatedly stops when running in a congested area, a possibility of the part load charge control using the driving motor 20 decreases so the SOC of the battery lowers.

Accordingly, when the hybrid electric vehicle runs in a congested area, a hybrid control unit 110 and/or the battery control unit 120 may perform the idle charge control mode using the starting/generating motor 70 having poor charging efficiency to prevent the SOC of the battery from being decreased.

Further, since the hybrid control unit 110 and/or the battery control unit 120 of the hybrid electric vehicle according to the exemplary embodiment of the related art charge the battery 60 only with power by regenerative braking of the driving motor 20 as illustrated in FIG. 3, when an accelerator pedal position sensor (APS) and a brake position sensor (BPS) are off (e.g., when a driver does not manipulate the accelerator pedal and the brake pedal), in other words, the hybrid electric vehicle performs coasting, charging efficiency is not high.

The above information disclosed in this section is only for enhancement of understanding of the background of the invention and therefore it may contain information that does not form the prior art that is already known in this country to a person of ordinary skill in the art.

SUMMARY

The present invention has been made in an effort to provide a method and a system for charging a battery of a hybrid electric vehicle having advantages of improving charging efficiency and improving fuel efficiency by controlling a controlled target related to battery charging (i.e., an engine, a driving motor, and a starting/generating motor) so power from the starter and generator motor and the driving motor may be combined to charge the battery when a vehicle travels in different driving conditions (e.g., congested city areas and highway areas).

An exemplary embodiment of the present invention provides a method of charging a battery for supplying driving power to a hybrid electric vehicle operated with power of an engine and a driving motor, the method including: determining when the vehicle is coasting (e.g., when the vehicle does not make frequent stops) based on when an accelerator pedal and a brake pedal are manipulated; determining when a state of charge (SOC) of the battery is a charged state having a value equal to or smaller than a set value; and in response to determining the value equal to or smaller than a set value and the vehicle coasting, maintaining the engine in a driving state and rotating the driving motor with power of the engine to charge the battery with generated power of the driving motor.

Determining when the vehicle is coasting may be based on a signal of an accelerator position detector configured to detect a position of an accelerator pedal and a brake position detector configured to detect a position of a brake pedal. Additionally, the determination may include determining that the vehicle is coasting when a value of the signal of the accelerator position detector and the brake position detector is a signal value corresponding to a set value within a set error range. When a driver is not in contact with the accelerator pedal and the brake pedal, set signal values within the set error range may be output from the accelerator position detector and the brake position detector, respectively.

Moreover, charging the battery may include starting the engine or rotating a starting/generating motor configured to generate power by the power of the engine to charge the battery with the generated power. Additionally, the charging of the battery may include transferring torque of the wheels of the vehicle to the driving motor to generate power and charging the battery with the generated power.

The hybrid electric vehicle may be a hybrid electric vehicle comprising an engine clutch configured to combine or separate the power of the engine and the power of the driving motor between the engine and the driving motor, and the charging of the battery may include coupling the engine clutch or maintaining a coupled state of the engine clutch.

Furthermore, charging the battery may include controlling torque of the engine to be a set torque. The controlling of the torque of the engine to be the set torque may include controlling the engine while maintaining revolutions per minute of the engine within a set range of revolutions per minute.

The charged state in which the SOC of the battery has a value equal to or smaller than the set value may be a state in which the SOC of the battery is positioned below the lowest value of a normal charge region. A normal charge region may be when the battery does not require charging and is not overcharged or undercharged.

Another exemplary embodiment of the present invention provides a system for charging a battery which supplies driving power to a hybrid electric vehicle operated by power of an engine and a driving motor, the system including: an accelerator position detector configured to detect a position of an accelerator pedal; a brake position detector configured to detect a position of a brake pedal; and a controller configured to charge the battery based on signals of the accelerator position detector and the brake position detector and a state of charge (SOC) of the battery, wherein the controller may include one or more processors or microprocessors operated by a set program, and the set program comprises a series of commands for executing the method of charging a battery of a hybrid electric vehicle according to the exemplary embodiment of the present invention.

When the controller controls the engine and the driving motor to charge the battery, the controller may receive at least one of a vehicle speed, revolutions per minute of the driving motor, a gear ratio, a value determining when to block fuel, torque of the driving motor, power of the driving motor, a temperature of a coolant of the engine, a temperature of oil of a transmission, a temperature of the battery, an exterior temperature, a value of an inclination, a shift position, a load quantity of electronic equipment, and a kick down ratio, and use the received value to control the engine and the driving motor.

As described above, according to the exemplary embodiments of the present invention, the controlled target related to the battery charge (i.e., the engine, the driving motor, and the starting/generating motor) may be controlled so the battery is charged by combining power of the starting/generating motor and the driving motor when a vehicle travels in a various conditions (e.g., the vehicle is coasting or travels in a downtown congested area in which the vehicle repeatedly stops), thereby improving charging efficiency and fuel efficiency.

DETAILED DESCRIPTION OF THE EMBODIMENTS

Figure 1:
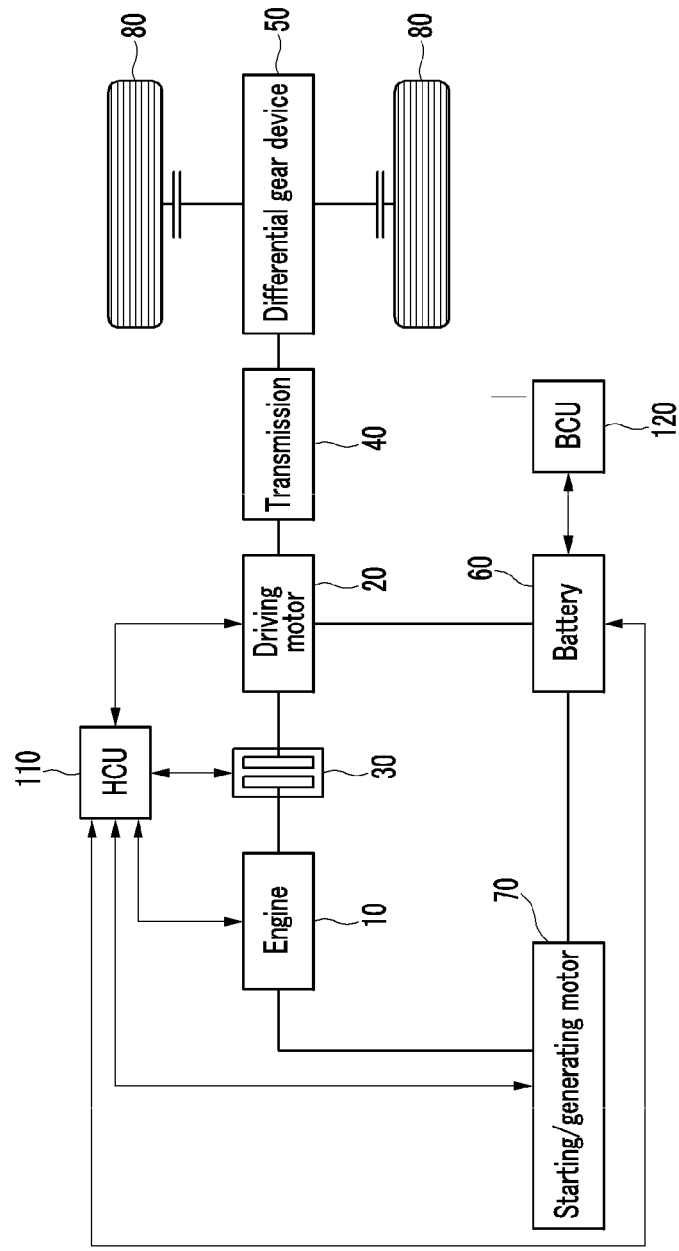
FIG. 1 is an exemplary diagram of a conventional hybrid electric vehicle, according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in the specification, unless explicitly described to the contrary, the word "comprise" and variations such as "comprises" or "comprising", will be understood to imply the inclusion of stated elements but not the exclusion of any other elements. Like reference numerals designate like elements throughout the specification.

Figure 4:
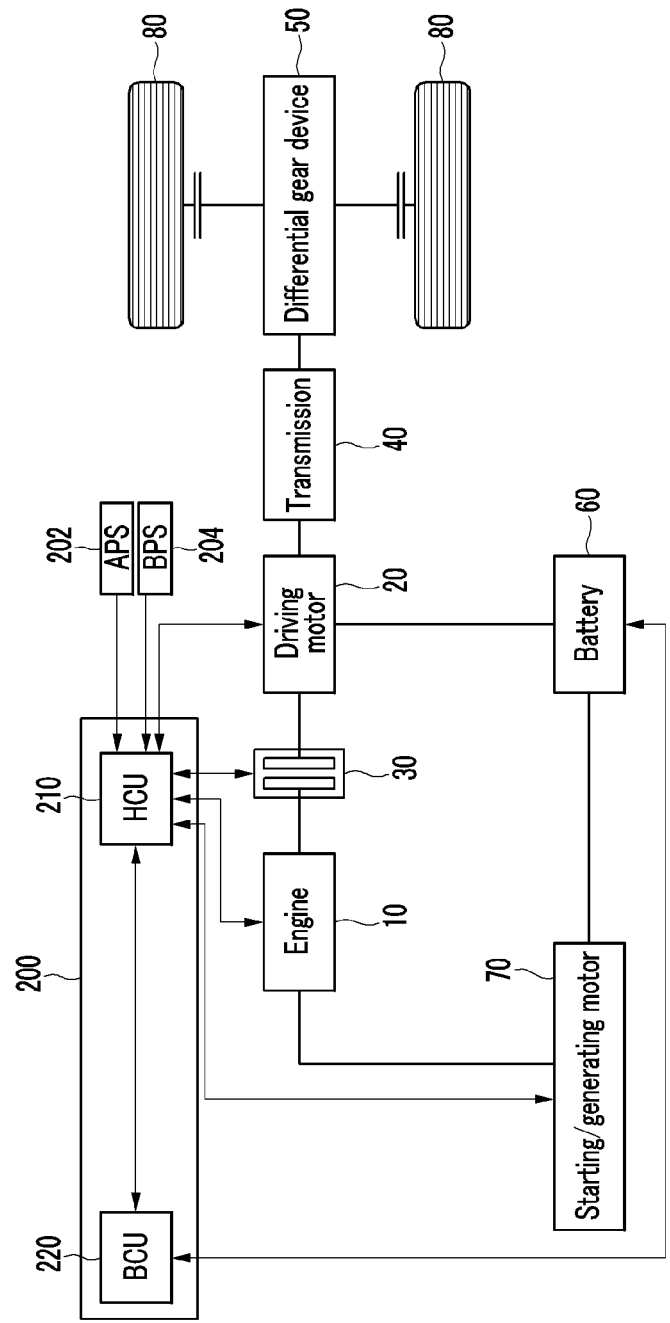
FIG. 4 is an exemplary diagram of a battery charging system of a hybrid electric vehicle according to an exemplary embodiment of the present invention.

FIG. 4 is an exemplary block diagram illustrating a battery charging system applied to a hybrid electric vehicle according to an exemplary embodiment of the present invention.

The battery charging system according to an exemplary embodiment of the present invention is a battery charging system for charging a battery which supplies driving power to the hybrid electric vehicle, and the system may include an accelerator position detector 202 configured to detect a position of an accelerator pedal (not illustrated); a brake position detector 204 configured to detect a position of a brake pedal (not illustrated); and a controller 200 configured to charge the battery based on a plurality of signals of the accelerator position detector 202, the brake position detector 204 and a state of charge (SOC) of the battery 60.

The accelerator position detector 202 may be an accelerator pedal position sensor (APS), but it should be understood that the scope of the present invention is not essentially limited thereto. The technical spirit of the present invention may be applied to a configuration capable of outputting a signal value corresponding to an actual position of the accelerator pedal. A configuration and an operation of the APS are obvious to a person of ordinary skill in the art, thus a more detailed descriptions thereof will be omitted in the present specification.

The brake position detector 204 may be a brake position sensor (BPS), but it should be understood that the scope of the present invention is not essentially limited thereto. The technical spirit of the present invention may be applied to a configuration capable of outputting a signal value corresponding to an actual position of the brake pedal. A configuration and an operation of the BPS are obvious to a person of ordinary skill in the art, thus a more detailed descriptions thereof will be omitted in the present specification.

The controller 200 may include one or more processors or microprocessors operated by a set program, and the set program may include a series of commands for executing a battery charging method according to an exemplary embodiment of the present invention to be described below.

In the exemplary embodiment of the present invention, the controller 200 may include a hybrid control unit (HCU) 210 configured to control the hybrid electric vehicle and a battery control unit (BCU) 220 configured to control and manage the battery for supplying the driving power to the hybrid electric vehicle.

In the battery charging method according to an exemplary embodiment of the present invention to be described below, partial processes may be performed by the battery control unit 220 and other partial processes may be performed by the hybrid control unit 210. However, it should be understood that the scope of the present invention is not limited to the description of the exemplary embodiment described below. The battery control unit 220 and the hybrid control unit 210 may perform a combination of processes different from that described in the exemplary embodiment.

Figure 5:
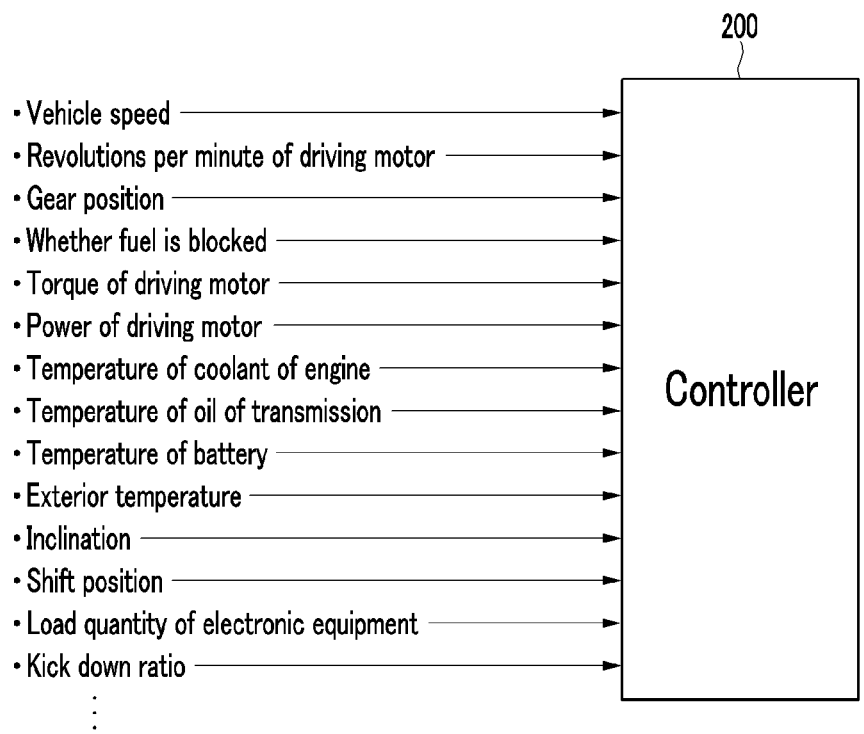
FIG. 5 is an exemplary diagram illustrating a signal input in a battery charging system of a hybrid electric vehicle according to an exemplary embodiment of the present invention.

When the controller 200 controls the engine 10 and the driving motor 20 to charge the battery 60 as illustrated in FIG. 5, the controller 200 may receive at least one of a vehicle speed, revolutions per minute of the driving motor 20, a gear ratio, a value determining when to block fuel, torque of the driving motor 20, power of the driving motor 20, a temperature of a coolant of the engine 10, a temperature of an oil of the transmission 40, a temperature of the battery 60, an exterior temperature, a value of an inclination of an inclined road on which the hybrid electric vehicle is positioned, a shift position, a load quantity of electronic equipment, and a kick down ratio, and may use the received value to control the engine 10 and the driving motor 20.

The received signals illustrated in FIG. 5 to be used by the controller 200 to the control the engine 10 and the driving motor 20 are obvious to a person of ordinary skill in the art, thus a detailed descriptions thereof will be omitted in the present specification.

Furthermore, a battery charging method of a hybrid electric vehicle according to an exemplary embodiment of the present invention will be described in detail with reference to the accompanying drawings.

Figure 6:
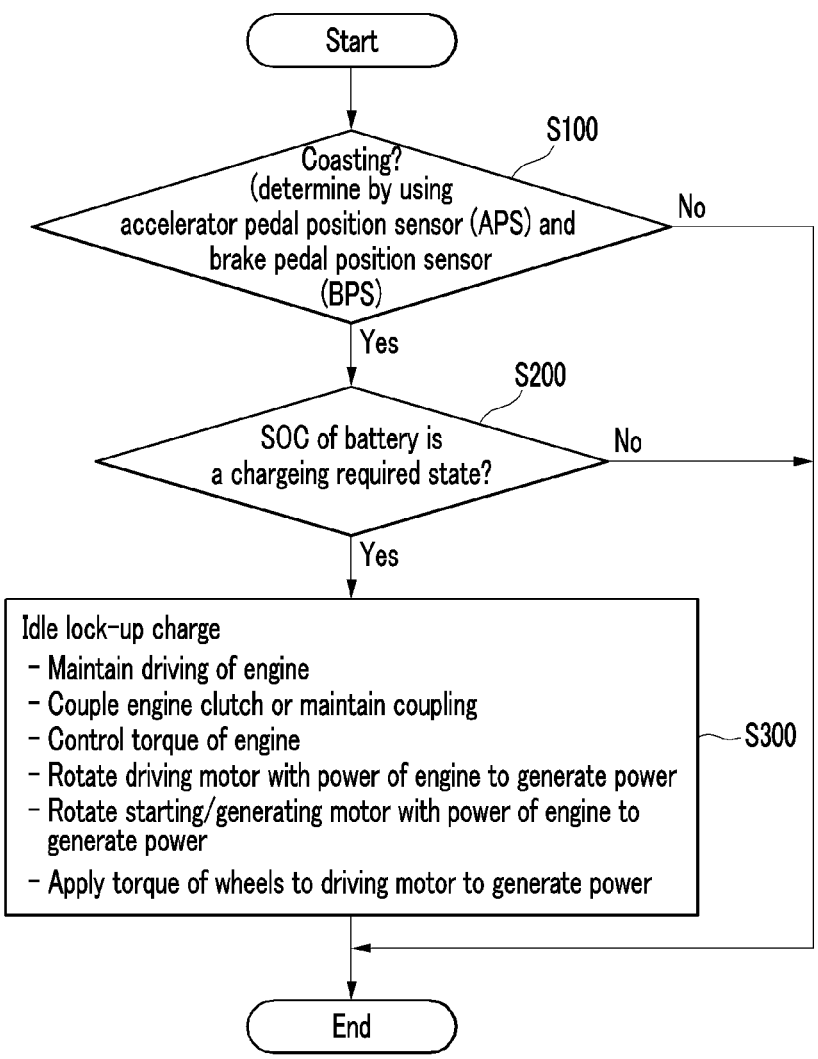
FIG. 6 is an exemplary flowchart illustrating a battery charging method of a hybrid electric vehicle according to an exemplary embodiment of the present invention.

FIG. 6 is an exemplary flowchart illustrating a battery charging method of a hybrid electric vehicle according to an exemplary embodiment of the present invention.

Figure 2:
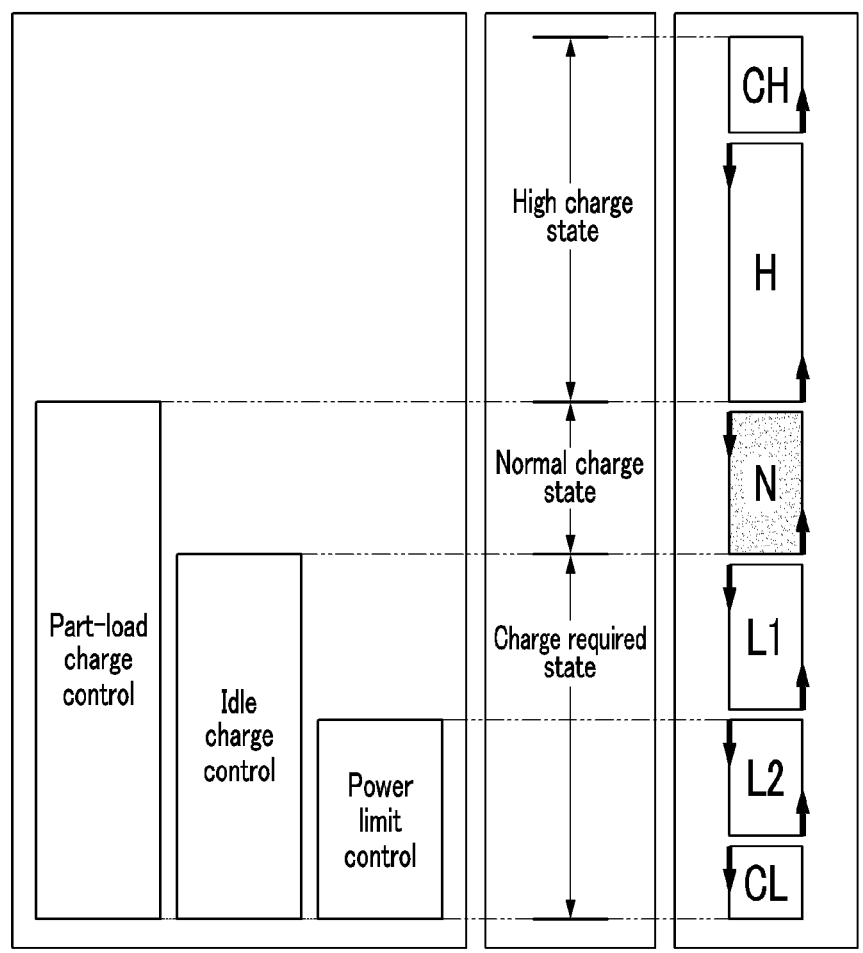
FIG. 2 is an exemplary diagram illustrating a state of charge (SOC) of a battery divided for a driving method of a conventional hybrid electric vehicle, according to the related art.

As illustrated in FIG. 6, the battery charging method of the hybrid electric vehicle may include: determining, by a controller, when the hybrid electric vehicle is coasting (S100); determining, by the controller, a state of charge (SOC) of the battery 60; determining when the battery 60 is in a discharged state wherein the battery 60 has a value equal to or smaller than a set value, thereby requiring charging (S200); and maintaining the engine 10 in a driving state and rotating the driving motor 20 with power of the engine 10 to charge the battery 60 with the generated power of the driving motor 20 when the battery 60 is in a charging required state and the hybrid electric vehicle is coasting (S300). When the battery 60 is in the charging required state and the hybrid electric vehicle is coasting, the controller may execute an idle lock up control in which the SOC of the battery 60 is positioned under a lowest value (i.e., 40% of the battery charged) of the normal charge region N (see FIG. 2), in other words, in the low charge regions L1 and L2, as illustrated in FIG. 2.

The controller 200 may receive a signal from the APS 202 for detecting a position of the accelerator pedal and the BPS 204 for detecting a position of the brake pedal to determine when the hybrid electric vehicle is coasting in step S100. Additionally, the controller 200 may determine when the hybrid electric vehicle is coasting based on the input signal of the APS 202 and the BPS 204. In other words, when a value of the signal of the APS 202 and the BPS 204 is a signal value corresponding to a set value (e.g., 0 or off) within a set error range, the controller 200 may determine that the hybrid electric vehicle is coasting. When the value of the signal of the APS 202 and the BPS 204 is the set value within the set error range, the controller 200 may determine that the accelerator pedal and the brake pedal are not engaged to determine the state as a coasting state.

Figure 7:
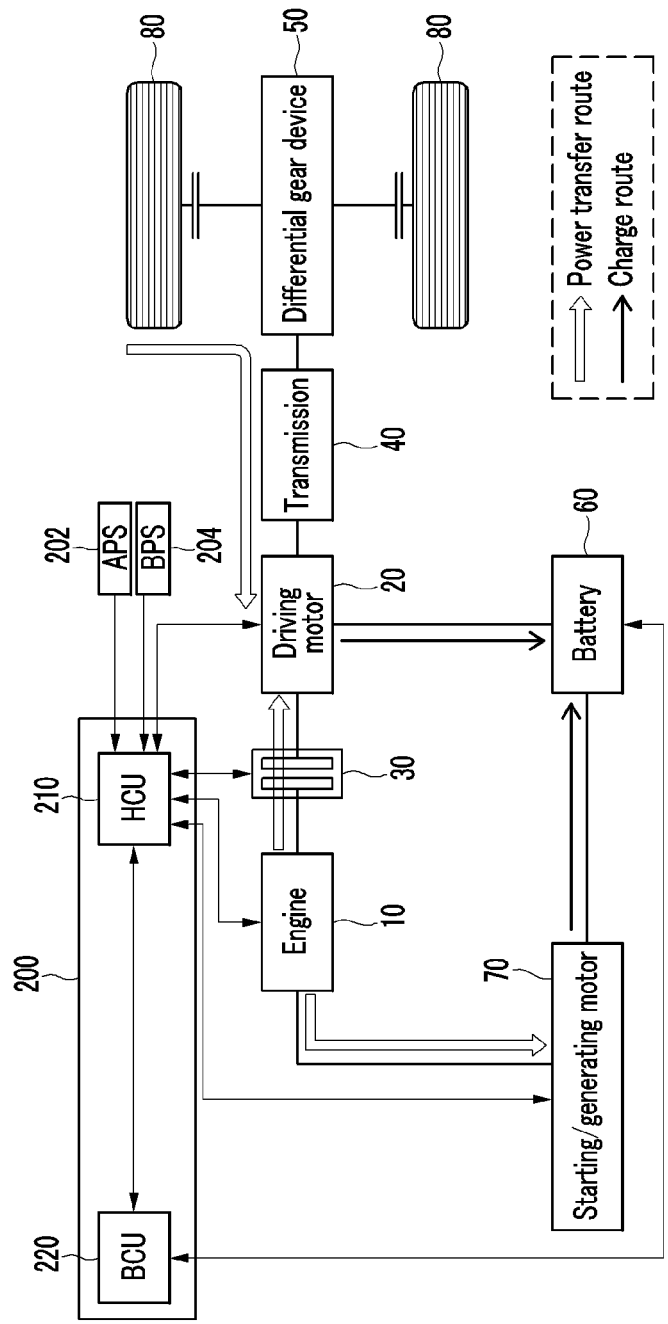
FIG. 7 is an exemplary diagram illustrating operations of a battery charging method and system of a hybrid electric vehicle according to an exemplary embodiment of the present invention.

In step S300 of charging the battery 60, as illustrated in FIG. 7, the controller 200 may start the engine 10 or rotate a starting/generating motor 70 to generate power to charge the battery 60 with the generated power. Further, the controller 200 may transfer torque of the vehicle wheels 80 to the driving motor 20 to generate power, and charge the battery 60 with the generated power. Additionally, the controller 200 may maintain a coupled state of the engine clutch 30 or may couple the engine clutch 30 to transfer the power of the engine 10 to the driving motor 20. The controller 200 may control the engine 10 to maintain appropriate torque of the engine when rotating the driving motor 20 and/or the starting/generating motor 70 with the power of the engine 10. Further, the controller 200 may control the engine 10 to maintain the revolutions per minute of the engine 10 within a set range of revolutions per minute (e.g., 1,000 rpm to 1,500 rpm) while rotating the torque of the engine 10.

Figure 3:
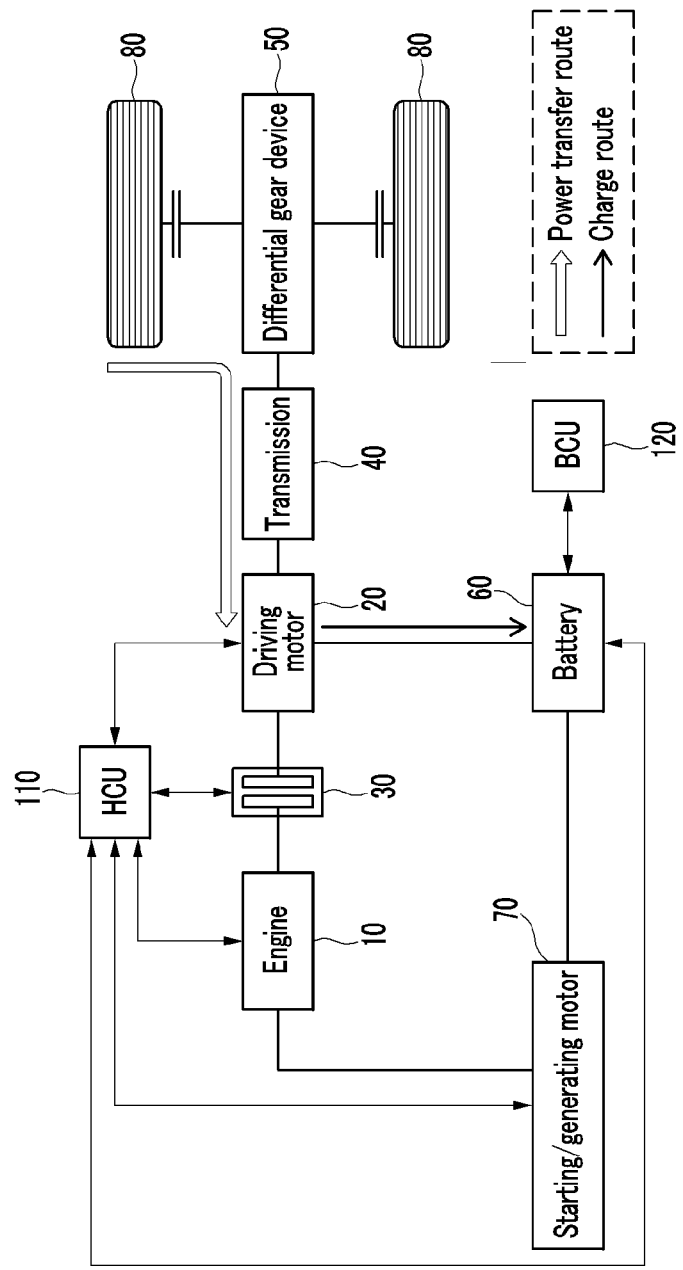
FIG. 3 is an exemplary diagram illustrating a battery charging method according to an exemplary embodiment of the related art.

As illustrated in FIG. 7, when the driving motor 20 and the starting/generating motor 70 generate power using both the power of the engine 10 and the torque of the wheels 80 and the battery 60 is charged with the generated power, charging efficiency may be higher than when the battery 60 is charged with the power generated by the starting/generating motor 70 which generates power only with the power of the engine 10 as illustrated in FIG. 3.

In other words, the driving motor 20 may be driven by the power of the engine 10 and the torque of the wheels 80, so efficiency of the engine 10 may be higher than when power is generated using only the power of the engine 10, as illustrated in FIG. 3. Accordingly, when the efficiency of the engine is about 21%, the efficiency of the engine as illustrated in FIG. 7 may be 29%. Accordingly, the battery charging method and system according to the exemplary embodiment of the present invention efficiently combine the driving of the starting/generating motor and the driving motor to charge the battery during coasting, thereby improving charging efficiency and fuel efficiency.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A method of charging a battery for supplying driving power to a vehicle operated with power of an engine and a driving motor, the method comprising:
    detecting, by an accelerator position detector, a position of an accelerator pedal;
    detecting, by a brake position detector, a position of a brake pedal; and
    charging, by a controller, the battery based on a plurality of signals from the accelerator position detector and the brake position detector and a state of charge of the battery;
    determining, by the controller, when the vehicle is coasting in response to a manipulation of the accelerator pedal and the brake pedal;
    determining, by the controller, when the state of charge of the battery is a charged state having a value equal to or smaller than a set value;
    maintaining, by the controller, the engine in a driving state and rotating the driving motor with power of the engine to charge the battery with power generated by the driving motor, when the state of charge of the battery is the charged state having the value equal to or smaller than the set value and the vehicle is coasting; and
    controlling, by the controller, a torque of the engine to a set torque by controlling the engine while maintaining revolutions per minute of the engine within a set range of revolutions per minute,
    wherein charging the battery comprises:
        rotating, by the controller, a starting/generating motor configured to generate power using the engine power to charge the battery with the generated power when the state of charge of the battery is the charged state having the value equal to or smaller than the set value and the vehicle is coasting; and
        while charging the battery using the starting/generating motor, transferring, by the controller, a torque of a plurality of vehicle wheels to the driving motor to generate power and charge the battery with the generated power when the state of charge of the battery is the charged state having the value equal to or smaller than the set value and the vehicle is coasting.

2. The method of claim 1, wherein determining when the vehicle is coasting comprises:
    determining, by the controller, when the vehicle is coasting based on a signal of the accelerator position detector and the brake position detector.

3. The method of claim 2, wherein determining when the vehicle is coasting comprises:
    determining, by the controller, when the signals of the accelerator position detector and the brake position detector correspond to set values within set error ranges.

4. The method of claim 3, further comprising setting, by the controller, a plurality of signal values within the set error ranges output from the accelerator position detector and the brake position detector, respectively, when a driver is not in contact with the accelerator pedal and the brake pedal.

5. The method of claim 1, wherein the vehicle is a hybrid electric vehicle comprising an engine clutch configured to combine or separate the power of the engine and the power of the driving motor between the engine and the driving motor, wherein the controller charges the battery by coupling the engine clutch or maintaining a coupled state of the engine clutch.

6. The method of claim 1, wherein the charged state in which the state of charge of the battery has the value equal to or smaller than the set value is a state in which the state of charge of the battery is positioned below the lowest value of a normal charge region.

7. A system for charging a battery supplying driving power to a vehicle operated by power of an engine and a driving motor, the system comprising:
    an accelerator position detector configured to detect a position of an accelerator pedal;
    a brake position detector configured to detect a position of a brake pedal; and
    a controller configured to:
        charge the battery based on a plurality of signals of the accelerator position detector and the brake position detector and a state of charge of the battery;
        determine when the vehicle is coasting based on a manipulation of the accelerator pedal and the brake pedal;
        determine when the state of charge of the battery is a charged state having a value equal to or smaller than a set value;
        maintain the engine in a driving state and rotate the driving motor with power of the engine to charge the battery with generated power of the driving motor when the state of charge of the battery is the charged state having the value equal to or smaller than the set value and the hybrid electric vehicle is coasting;
        control a torque of the engine to a set torque by controlling the engine while maintaining revolutions per minute of the engine within a set range of revolutions per minute;
        rotate a starting/generating motor configured to generate power using the engine power to charge the battery with the generated power when the state of charge of the battery is the charged state having the value equal to or smaller than the set value and the vehicle is coasting; and
        while charging the battery using the starting/generating motor, transfer a torque of a plurality of vehicle wheels to the driving motor to generate power and charge the battery with the generated power when the state of charge of the battery is the charged state having the value equal to or smaller than the set value and the vehicle is coasting.

8. The system of claim 7, wherein the controller may control the engine and the driving motor using at least one selected from a group consisting of: a vehicle speed, revolutions per minute of the driving motor, a gear ratio, a value determining when to block fuel, torque of the driving motor, power of the driving motor, a temperature of a coolant of the engine, a temperature of oil of a transmission, a temperature of the battery, an exterior temperature, a value of an inclination, a shift position, a load quantity of electronic equipment, and a kick down ratio.

9. The system of claim 7, wherein the controller is further configured to:
    determine when the vehicle is coasting when the signals of the accelerator position detector and the brake position detector correspond to set values within set error ranges.

10. The system of claim 9, wherein the controller is further configured to:
    set a plurality of signal values within the set error ranges output from the accelerator position detector and the brake position detector, respectively, when a driver is not in contact with the accelerator pedal and the brake pedal.

11. A non-transitory computer readable medium containing program instructions executed by a processor or controller, the computer readable medium comprising:
    program instructions that control an accelerator position detector to detect a position of an accelerator pedal;
    program instructions that control a brake position detector to detect a position of a brake pedal;
    program instructions that charge a battery based on a plurality of signals of the accelerator position detector and the brake position detector and a state of charge of the battery;
    program instructions that determine when a vehicle is coasting based on a manipulation of the accelerator pedal and the brake pedal;
    program instructions that determine when the state of charge of the battery is a charged state having a value equal to or smaller than a set value;
    program instructions that maintain an engine in a driving state and rotate a driving motor with power of the engine to charge the battery with generated power of the driving motor when the state of charge of the battery is the charged state having the value equal to or smaller than the set value and the vehicle is coasting;
    program instructions that control a torque of the engine to a set torque by controlling the engine while maintaining revolutions per minute of the engine within a set range of revolutions per minute;
    program instructions that rotate a starting/generating motor configured to generate power using the engine power to charge the battery with the generated power when the state of charge of the battery is the charged state having the value equal to or smaller than the set value and the vehicle is coasting; and
    program instructions that, while charging the battery using the starting/generating motor, transfer torque of a plurality of vehicle wheels to the driving motor to generate power and charge the battery with the generated power when the state of charge of the battery is the charged state having the value equal to or smaller than the set value and the vehicle is coasting.

12. The computer readable medium of claim 11, further comprising:
    program instructions that determine when the vehicle is coasting when the signals of the accelerator position detector and the brake position detector correspond to set values within set error ranges.

13. The computer readable medium of claim 12, further comprising:
    program instructions that set a plurality of signal values within the set error ranges output from the accelerator position detector and the brake position detector, respectively when a driver is not in contact with the accelerator pedal and the brake pedal.

* * * * *